(12) United States Patent
Wipperfurth et al.

(10) Patent No.: US 6,935,270 B2
(45) Date of Patent: Aug. 30, 2005

(54) MILKING AND APPLICATION TEAT CUP, SYSTEM, AND METHOD

(75) Inventors: Stuart Wipperfurth, Cambridge, WI (US); Russell Kolstad, Waunakee, WI (US)

(73) Assignee: DeLaval, Inc., Waunakee, WI (US)

( * ) Notice: Subject to any disclaimer, the term of this patent is extended or adjusted under 35 U.S.C. 154(b) by 0 days.

(21) Appl. No.: 10/652,585

(22) Filed: Aug. 29, 2003

(65) Prior Publication Data

US 2005/0045108 A1    Mar. 3, 2005

(51) Int. Cl.[7] ............................. A01J 5/06; A01J 7/04
(52) U.S. Cl. ............................. 119/14.02; 119/14.47; 119/670
(58) Field of Search ............. 119/14.02, 14.18, 119/14.47, 14.48, 14.49, 14.51, 14.53, 670

(56) References Cited

U.S. PATENT DOCUMENTS

| | | |
|---|---|---|
| 3,648,698 A | 3/1972 | Keith |
| 3,713,423 A | 1/1973 | Sparr, Sr. |
| 4,034,714 A | 7/1977 | Umbaugh et al. |
| 4,305,346 A | 12/1981 | Sparr, Sr. |
| 4,924,809 A | 5/1990 | Verbrugge |
| 5,101,770 A | 4/1992 | Stevenson ................... 119/651 |
| 5,195,455 A | 3/1993 | Van der Lely et al. |
| 5,390,627 A | 2/1995 | Van der Berg et al. |
| 5,535,700 A | 7/1996 | Boudreau |
| 5,673,650 A | 10/1997 | Mottram et al. |
| 5,934,220 A | 8/1999 | Hall et al. |
| 6,234,110 B1 | 5/2001 | Xavier |
| 6,302,058 B1 | 10/2001 | Dahl et al. |
| 6,591,784 B1 * | 7/2003 | Eriksson ..................... 119/670 |
| 2002/0185071 A1 * | 12/2002 | Guo ......................... 119/14.47 |

FOREIGN PATENT DOCUMENTS

| | | |
|---|---|---|
| DE | 2522794 | 8/1977 |
| EP | 86/201137 | 6/1986 |
| EP | 89/108565 | 6/1986 |
| EP | 89/118720 | 6/1986 |
| EP | 87/202659 | 12/1987 |
| EP | 97/201047 | 4/1997 |
| GB | 918766 | 2/1959 |
| WO | 89/00378 | 1/1989 |
| WO | 99/46978 | 9/1999 |

* cited by examiner

Primary Examiner—Robert P. Swiatek
(74) Attorney, Agent, or Firm—Foley & Lardner LLP

(57) ABSTRACT

A milking and applicator teat cup is configured to receive an animal teat within a liner located in a shell. At the openings of the liner and shell where the teat is received, there is an applicator configured to dispense disinfectant, conditioning, and/or cleaning solution to the animal teat. The applicator is designed to discharge the solution horizontally across the openings of the liner and the shell. Such a teat cup can be integrated into a milking system having a valve manifold coupled to a number of teat cups and controlling flow of milk from the number of teat cups and flow of fluid to the applicators, and a controller including logic configured to provide control signals to the valve manifold. The controller signals the valve manifold to pre-charge a hose or line delivering fluid to the applicator and signals the valve manifold for the end of milking and begin delivery of the fluid from the applicator.

35 Claims, 11 Drawing Sheets

Section 6-6

Section 7-7

Section 8-8

Section 13-13

Section 14-14

Section 15-15

MILKING AND APPLICATION TEAT CUP, SYSTEM, AND METHOD

FIELD OF THE INVENTION

The present invention is related to animal milking systems and methods. More specifically, the present invention relates to a combination milking and cleaning teat cup, system and method.

BACKGROUND OF THE INVENTION

Various milking devices, systems, and methods have been developed that include a teat cup connected to a milking machine. Typically, the teat cup has a flexible inner lining and an inflexible outer shell. The inner lining or liner is commonly called an inflation. The teat cup operates to create a milking action by alternately reducing and increasing the pressure between the liner and the shell (a.k.a. "outside the liner") while a constant reduced pressure is maintained between the liner and the teat (a.k.a. "inside the liner"). The alternating pressure between the liner and the shell can be adjusted using a vacuum producing source.

Cleaning, disinfecting, and/or protecting the animal teats is an important part of the milking process. The use of disinfectant and/or skin conditioner can prevent the teat from becoming infected or dry, or "affected by environment, (i.e. dry, chapped, frost-bitten, etc.)" In some situations, after the milking system vacuum applied to the teat inside the liner is shut off, the teat cup can rapidly fall from the teat. The vacuum suction is lost, and the cling of the liner surrounding the teat surface is broken. In other situations, where teats are long, large, and/or filled with residual milk yield, the milking teat cup clings to the teat for a period of time until forcibly removed manually or by mechanical removal devices. A teat cup application system should deliver skin conditioner/skin disinfectant properly in all situations.

During the closing seconds of milking action, prior to the determination of end-of-milk flow and milking vacuum shut off, the teats with little or no residual milk yield become internally exposed to milking system vacuum through the opening of the teat orifice caused by the pneumatic/mechanical action of milking pulsation. The exposure of the internal teat cistern to milking vacuum through the teat orifice and streak canal can result in cisternal pressure levels below atmospheric, or in other words, partially vacuumized. After the milking vacuum is shut off, the inside liner cavity beneath the teat end returns to atmospheric pressure. The resulting pressure differential between the external end of the streak canal at the teat orifice and the internal end of the streak canal's opening into the teat cistern can actively draw liquid, micro-organisms, and microscopic debris into or through the streak canal towards the teat cistern, where it can infect or irritate the streak canal or its opening into the teat cistern. A milking and disinfectant/conditioner application system should avoid interacting with the teat during this momentary peak pressure differential so that the applied skin conditioner/skin disinfectant is not pulled into/through the streak canal aggressively.

It is considered important in conventional systems where skin conditioner and/or skin disinfectant is applied manually using a cup-dipping (submersion) application that it be applied within seconds of removal of the milking teat cup. The primary reason is that the teat orifice remains stretched and distended as a result of the pneumatic/mechanical action of milking. The application of fluid has better access to the convoluted tissue opening for germicidal or conditioning activity prior to the teat tissue regaining normal circulation under atmospheric conditions and subsequent involution of the teat orifice and streak canal. Additionally, the teat cistern's deteriorating residual vacuum can assist a droplet in coating the distal surfaces of the streak canal for more effective germicidal or conditioning activity.

Using too much fluid during the application process can have a negative economic and environmental effect. Conversely, there is a negative economic and animal health influence created by using too little fluid or inconsistently or incorrectly applying it. It is conventionally accepted that the teat submersion application is the most effective and economic. There is a need to deliver the same results of skin coating and passive, atmospheric arrival of disinfectant or conditioner at the teat orifice, as with submersion, without the kinetic energy of directed forces at the teat orifice.

Converting the cleaning and/or disinfectant fluid or a substantial portion thereof into an aerosol, or converting its active sanitizing components or a portion thereof into a vapor through atomizing nozzles or other fractionation principles has negative environmental and human health effects.

The maintenance of the milking liner's shape in the teat cup assembly is dependent upon, among other things, the retaining structure of the shell component of the teat cup assembly. As the elastic liner fatigues through use, the opening of the liner or mouthpiece, which forms the final vacuum seal around the animal's teat, can become misshapen. Typically, this mouthpiece seal or lip becomes out-of-round or distended. While the milking industry's concern is with the physiologic interaction between liner and teat for milking performance, there is a need to address the maintenance of shape of the mouthpiece so that it's shape does not interfere with the delivery of disinfectant and/or conditioning fluid.

Thus, there is a need for an improved teat milking and disinfectant/conditioner application system and method. Further, there is a need to provide uniform amounts of disinfectant and/or conditioner to the teat. Yet further, there is a need to combine the milking and application functions into one apparatus without losing effectiveness and economy of the traditional fluid submersion technique.

SUMMARY OF THE INVENTION

An embodiment of the invention relates to a milking and application teat cup configured to receive an animal teat within a liner located in a shell. At the openings of the liner and shell where the teat is received, there is a fluid applicator configured to dispense disinfectant and/or conditioning solution to the animal's teat. The applicator is designed to direct or spray the solution horizontally across the openings of the liner and the shell.

An exemplary embodiment relates to a milking teat cup assembly including a structural container component defining a shell, a liner component configured to be mounted in the structural container component, and an applicator integral with the shell and configured to control the shape/position of the liner mouthpiece and apply fluid in a horizontal and inward fashion at the top of the shell.

Another exemplary embodiment relates to a milking teat cup configured to apply a fluid treatment to a teat immediately after milking of the teat is completed by providing a thin sheet pattern flow of the fluid treatment across the top of the teat cup. The teat cup includes a shell having a top opening for receiving a teat and a bottom connection coupled to a milk receiving device, a liner located within the shell and having an open mouthpiece located proximate to the top opening of the shell, and an applicator with orifices located along a perimeter proximate to the top opening of the shell. The applicator provides fluid treatment through the orifices to the teat received by the shell in approximately a plane parallel to the top face or mouthpiece of the liner and across the top opening of the shell.

Another exemplary embodiment relates to a combination milking and applicator device having a flexible milking sleeve, an inflexible shell surrounding the flexible milking sleeve, and a applicator component around openings of the flexible milking sleeve and the inflexible shell. The flexible milking sleeve has a shape for insertion of a teat. The inflexible shell provides for a vacuum space between the flexible milking sleeve and the inflexible shell. The applicator component is configured to dispense cleaning fluid over the openings of the flexible milking sleeve.

Another exemplary embodiment relates to a milking system including a combination of milking and applicator device. The milking system includes a number of teat cups having applicators integrally attached thereto and configured to apply fluid in a horizontal and inward fashion across a top of the teat cups, a valve manifold coupled to the number of teat cups and controlling the flow of fluid to the applicators, and a controller including logic configured to provide control signals to the valve manifold. The controller signals the valve manifold to pre-charge a line delivering fluid to the applicator and signals the valve manifold to begin delivery of the fluid from the applicator.

Another exemplary embodiment relates to a milking method including a combination milking and applicator device. The milking method includes commencing a milking session in which milk is delivered from animal teats engaged by a number of teat cups, pre-charging a fluid line coupled to the number of teat cups with a disinfecting or conditioning fluid or pausing before pre-charge to insure normal delivery of milk from teats, terminating the milking session, and dispensing the disinfectant and/or conditioning fluid from the fluid pre-charge out through applicators in the number of teat cups. The dispensing commences when the number of teat cups begin to disengage from the animal teats and the configuration between teat cups and teats is controlled or predictable.

Further objects, features and advantages of the invention will be apparent from the following detailed description when taken in conjunction with the accompanying drawings.

DETAILED DESCRIPTION OF EXEMPLARY EMBODIMENTS

Figure 1:
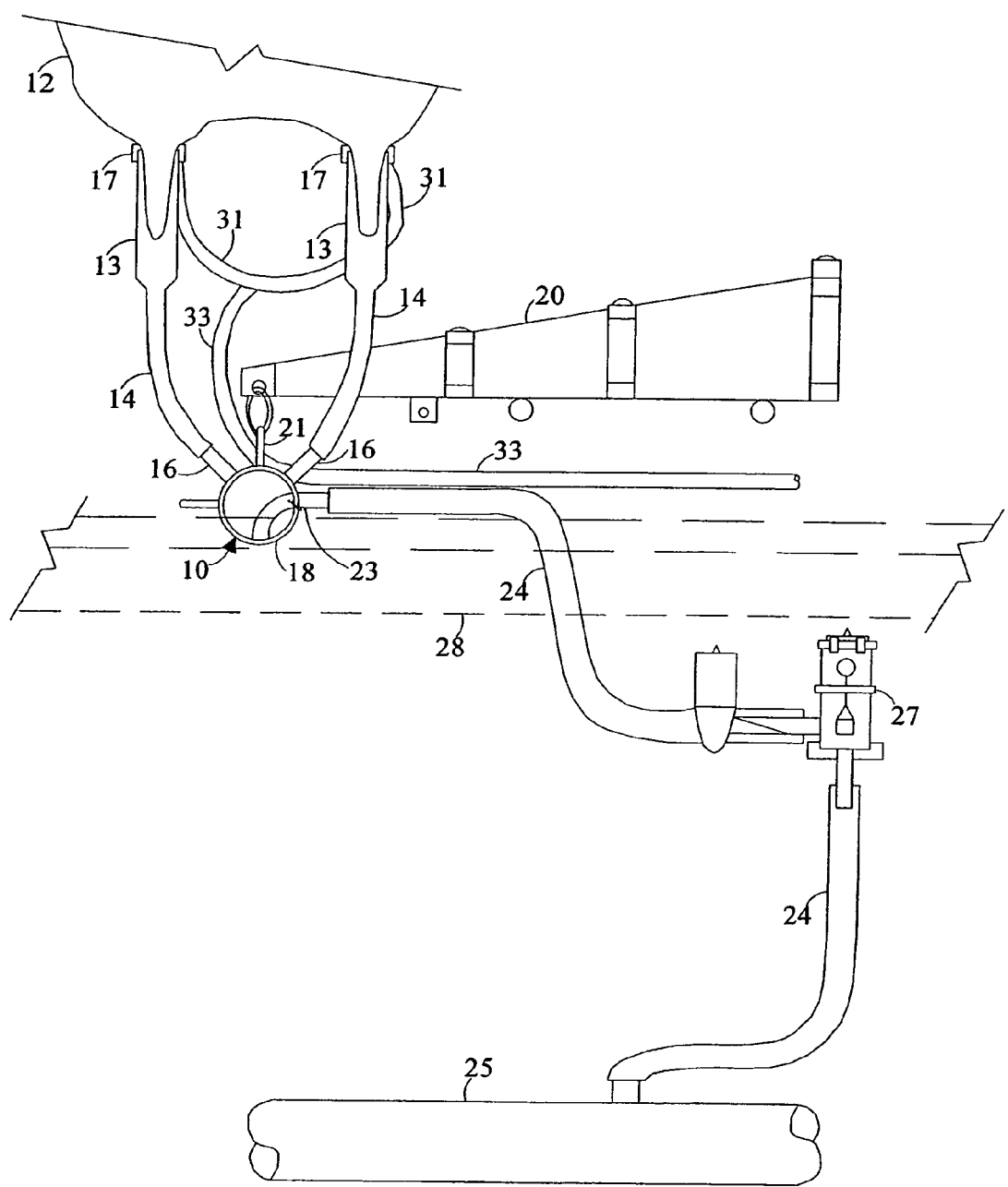
FIG. 1 is a simplified view of a portion of a milking system including a teat cup cluster with disinfecting applicators in accordance with the invention.

In reference to the drawings, a milking and applicator teat cup, system, and method in accordance with the invention are shown in conjunction with a portion of a milking system of the type utilized in automatic milking parlors. The milking system shown in FIG. 1 is oriented in position for milking a cow 12 with teat cups 13 attached to the teats of the udder. The milking system described with reference to FIG. 1 includes a side outlet milking claw for illustration purposes. Other milking system configurations can also include the milking and applicator teat cup. In the system, the milk is directed from the liners of the teat cups 13 through flexible milk tubes or "short milk hoses or tubes" 14 through inlets 16 to a milking bowl 18 of a claw 10. The claw 10 is supported by a teat cup cluster support 20 that is connected to a hanger 21 of the milking claw. The milk exits from the bowl 18 of the claw through an outlet tube 23 to which a milk hose 24 is coupled. The milk hose 24 is connected to a milking pipe 25 that is under a milking vacuum so as to draw the milk from the milk hose 24 into the milk pipe 25. For purposes of illustration, a milk flow sensor 27 is shown in connection with the milk hose 24 to sense milk flow and provide an indication when the cow has been milked sufficiently so that the teat cups 13 may be automatically detached from the cow.

As illustrated in FIG. 1, the support 20 is connected to the claw 10 to position it at a desired height above the platform 28 on which the cow stands. As can be seen from FIG. 1, the outlet tube 23 extends out from the bowl 18 in a sideways direction at a position between the top side of the bowl at which the milk inlet 16 is formed and the bottom of the bowl. This side outlet arrangement allows the milk hose 24 to be readily connected to the outlet tube 23 without interference with the milk inlet 16, the short milking hoses 14, or the hanger 21.

The teat cup 13 can include an applicator 17 near the opening of the teat cup 13 that receives the cow teat. The applicator 17 dispenses disinfectant and/or conditioning solution onto the cow teats after milking as the teat cup 13 descends from the teat. The solution dispensed by the applicator 17 is received from a fluid hose 31 via a cleaning solution line 33. The cleaning solution line 33 is preferably connected to a large container (not shown) of conditioning and/or disinfectant solution.

Figure 2:
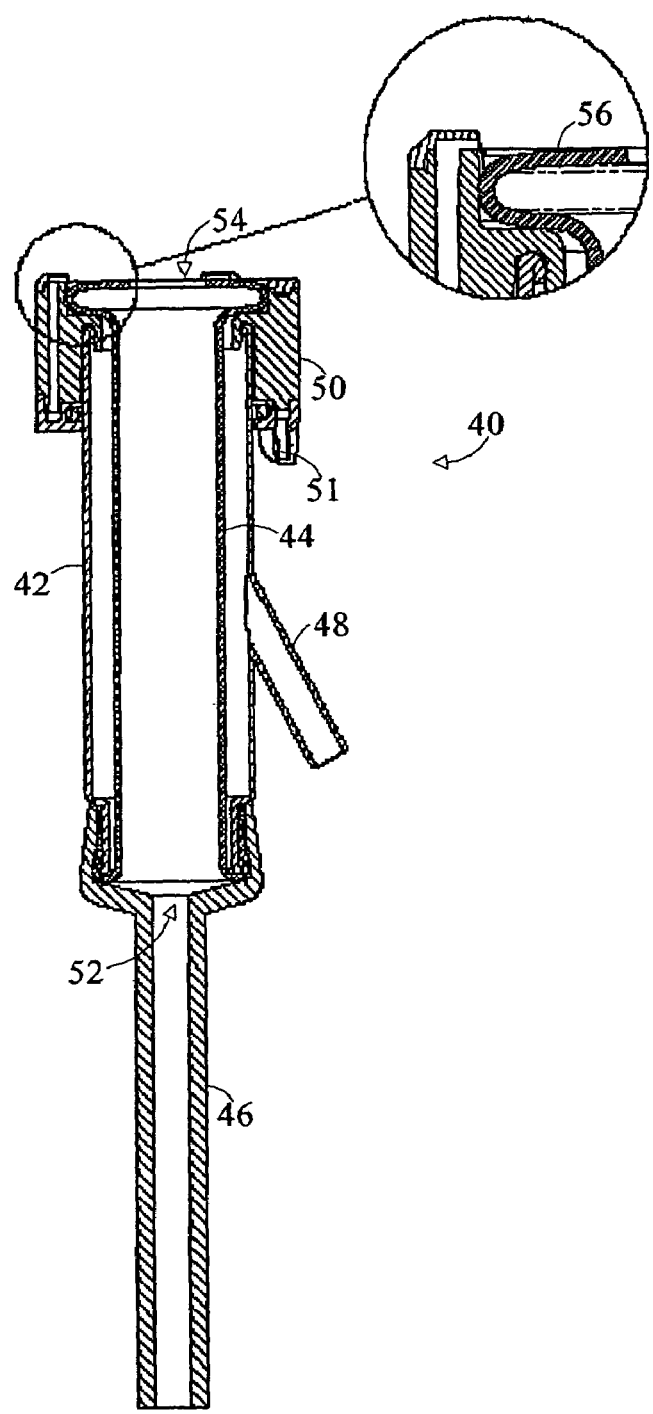
FIG. 2 is a cross-sectional side view of a milking teat cup in accordance with an exemplary embodiment.

An exemplary embodiment for the milking teat cup is illustrated in FIGS. 2–13. FIG. 2 illustrates a milking teat cup 40 including a shell 42, a liner 44, a flexible short milk tube 46, a pressure connector 48, an applicator 50, and a fluid inlet 51. The shell 42 can be a cylindrical-shaped cup formed of an inflexible material, such as steel. The shell 42 is formed to have a bottom opening 52 proximate the flexible short milk tube 46 and an exterior top opening 54 proximate the applicator 50.

The liner 44 is preferably located inside the shell 42. The liner 44 can be cylindrical-shaped and formed of a flexible material, such as rubber. At an end of the liner 44 proximate the applicator 50, the liner 44 has a mouthpiece 56 which preferably extends laterally outward from the liner 44.

The flexible short milk tube 46 is coupled to a milking system and provides a connection passageway through which milk obtained from a teat inserted in the milking and applicator teat cup 40 is taken to a milk storage location. The pressure connector 48 provides an opening to the volume between the shell 42 and liner 44. A vacuum device can be coupled to the pressure connector 48 to facilitate the changing of pressure within the volume between the shell 42 and liner 44. Preferably, air is extracted through pressure connector 48 using the vacuum force to counterbalance the vacuum applied inside liner 44 through flexible short milk tube 46. The vacuum action is alternately stopped and air travels through the pressure connector 48 such that additional air is provided to the volume between the shell 42 and the liner 44 to change the pressure. Such pressure change results in the compressing of the liner 44 around the teat. The resumed supply of vacuum results in the returning of the liner 44 to normal condition. The changes in pressure on the liner 44 provides the milking action force on the teat.

The shell 42 defines a rigid housing that separates the ambient environment from a cavity surrounding the exterior of the liner 44. The cavity pressure is modulated to affect the shape of the liner 44 on and around the teat. The teat is inserted into the interior opening of the liner 44 and held within the liner 44 by vacuum and frictional forces.

The applicator 50 can be an integral part of the shell 42 of the milking teat cup 40. Fluid, such as disinfectant and/or conditioning solution, can be provided to the applicator 50 via the fluid inlet 51. In an exemplary embodiment, a hose configured to transport the fluid is coupled to the fluid inlet 51.

In the milking industry, there is a large variation of liner or inflation types, however liners are principally divided into a few categories. Categories are based on the formation of the exterior opening of the milking liner which defines the shape of mouthpiece opening into the milking interior or bore of the liner, as well as the closure or vacuum seal of the modulated pressure inter-cavity between the interior of the shell 42 and the exterior of the liner 44 proximate the top opening 54. Principal categories are differentiated by (1) a ring-formed or mechanically created exterior opening mouthpiece, without overlapping shell-edge elastomeric vacuum seal, where vacuum seal is created inside the interior circumference of the shell's distal end; and (2) a mold-formed exterior opening mouthpiece, with overlapping shell-edge elastomeric vacuum seal extension(commonly referred to as mouthpiece "skirt") where vacuum seal is created at the circumferential edge of the distal end of the shell.

The milking teat cup 40 illustrated and described with reference to FIG. 2 includes the extension 56 that is a ring or mechanically shaped mouthpiece, such as characteristic to liner type one described above. Opening mouthpiece 96 described with reference to FIG. 9 below is an example of the mold-formed exterior opening mouthpiece characteristic to liner type two. One difference between liner type one and type two is that with type one liners the applicator 50 assists in the creation of the vacuum cavity seal between the liner 44 and the shell 42. The applicator 50 of both type one and type two helps to maintain the shape of mouthpiece and insure the seal between the mouthpiece lip and teat.

The applicator 50, in an exemplary embodiment, is designed such that disinfectant and/or conditioning fluid is applied horizontally inward, above the mouthpiece lip 56 of the liner 44 and in a sheet-like flow pattern to maximize circumferential application on the teat skin just above the mouthpiece lip-to-teat seal. The applicator 50 is designed to retain the exterior mouthpiece of the liner 44, and assist in the maintenance of the exterior mouthpiece shape (roundness, mouthpiece lip distention, etc.). The applicator 50 is also designed to constrain continuous concentricity between mouthpiece and shell 42 (which deteriorates with fatigue and use) to create continuous concentricity of applicator around the teat and preserve vertical dimension of fluid flow pattern above the mouthpiece lip-to-teat seal. The applicator 50 also insures the essential vacuum seal of the modulated pressure inter-cavity between the interior of the shell 42 and the exterior of the liner 44 around the exterior of top opening 54 of the liner 44.

Figure 3:
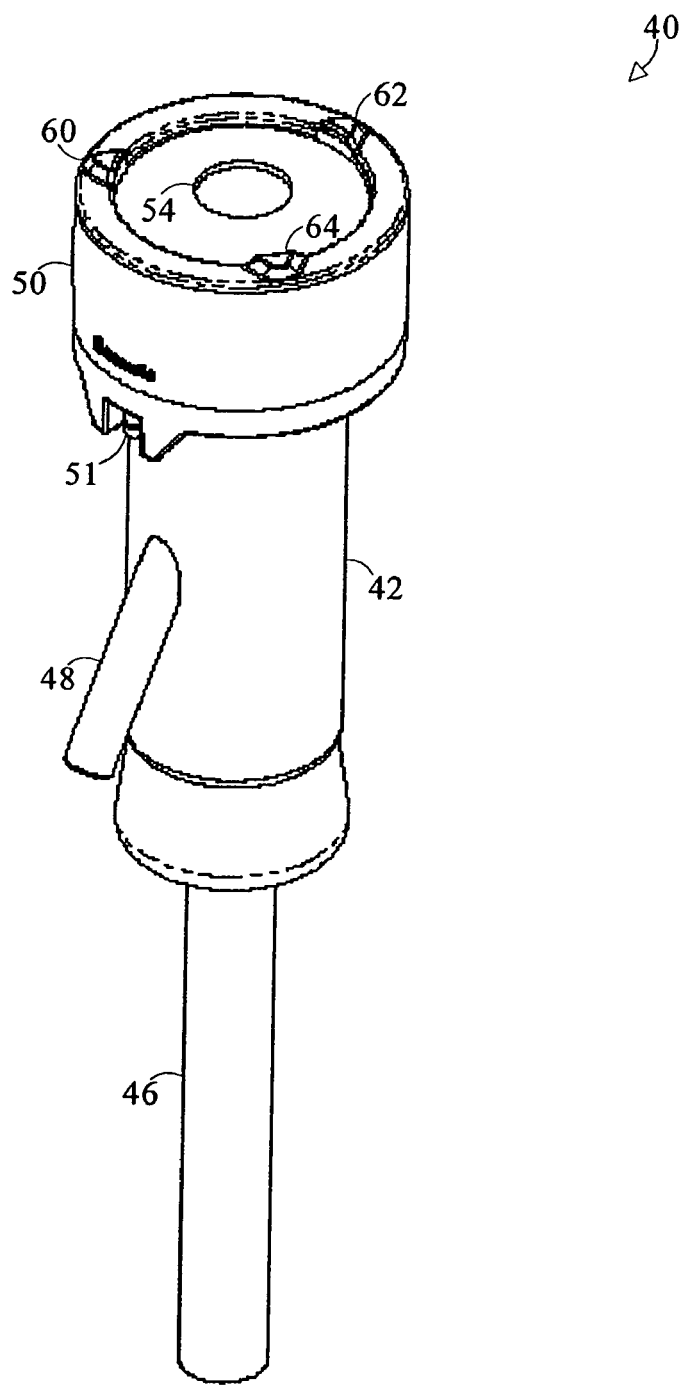
FIG. 3 is a perspective view of the milking teat cup of FIG. 2.

FIG. 3 illustrates the milking teat cup 40 in a perspective view. The applicator 50 includes orifices 60, 62, and 64 positioned to enable the delivery of fluid to the teat positioned inside the opening 54. Orifices 60, 62, and 64 deliver the fluid disinfectant and/or conditioning solution received from the fluid inlet 51 across a horizontal plane over the opening 54. As such, the disinfectant and/or conditioning solution can be applied to the teat as the teat is being removed from the shell 42 and before it is completely free of the teat cup.

Figure 4:
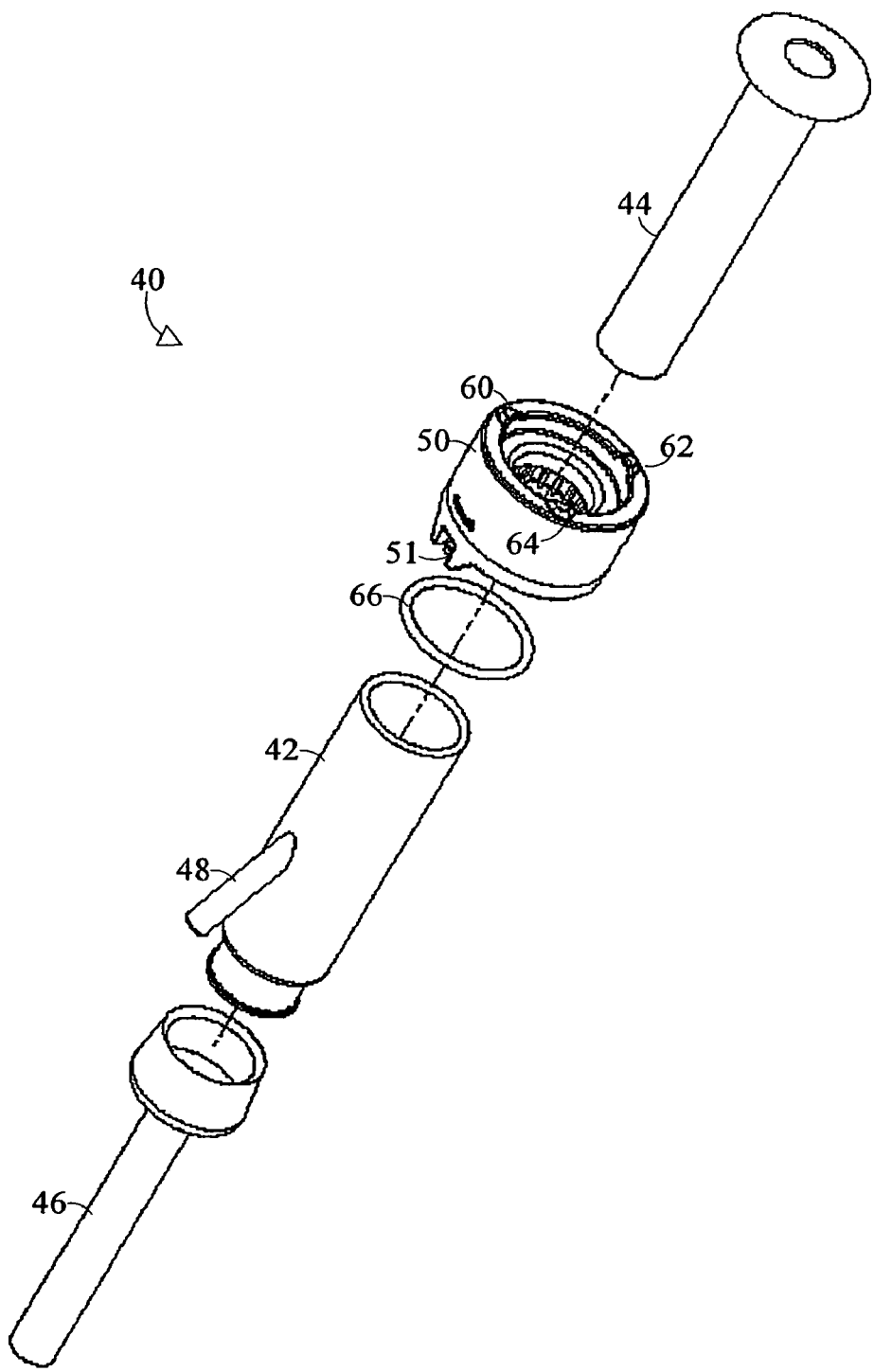
FIG. 4 is an exploded view of the milking teat cup of FIG. 2.

FIG. 4 illustrates the milking teat cup 40 from an exploded view. The flexible short milk tube 46 is coupled to the shell 42 at one end. At the opposite end, the applicator 50 is coupled to the shell 42 and the liner 44 is placed through the applicator 50 and into the shell 42. In an exemplary embodiment, an O-ring 66 is placed between the applicator 50 and the shell 42 for secure sealing between the two.

Figure 5:
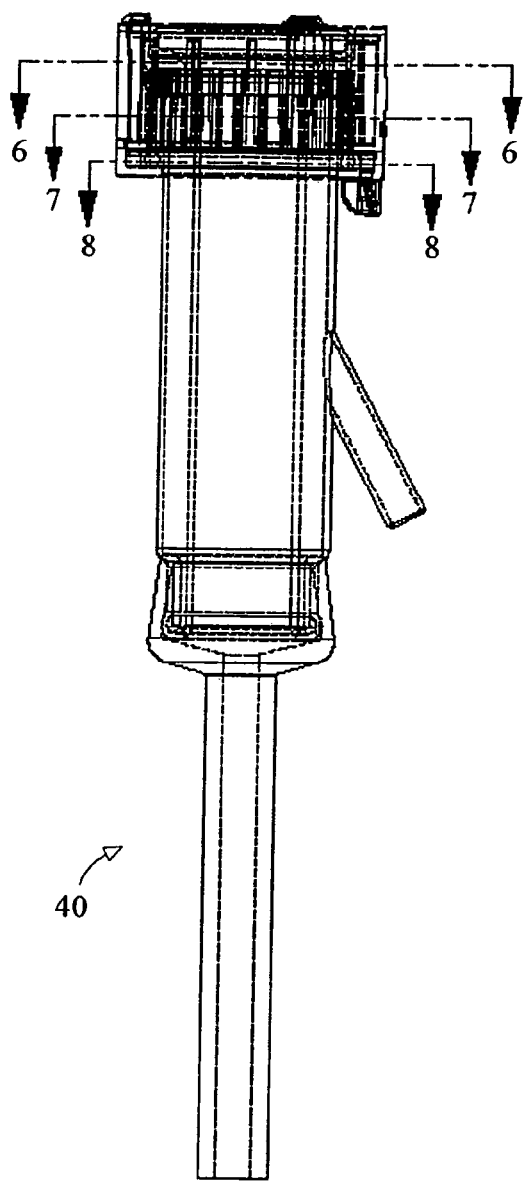
FIG. 5 is a side view of the milking teat cup of FIG. 2.
Figure 6:
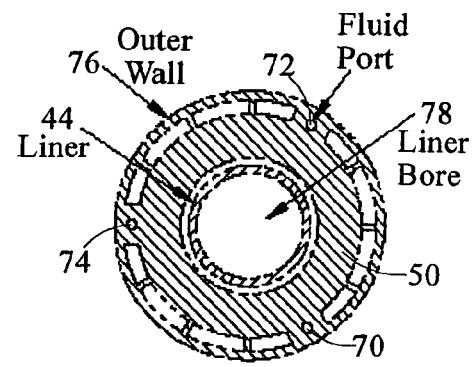
FIG. 6 is a cross-sectional view of the milking teat cup of FIG. 5 taken along the lines 6—6 of FIG. 5.
Figure 7:
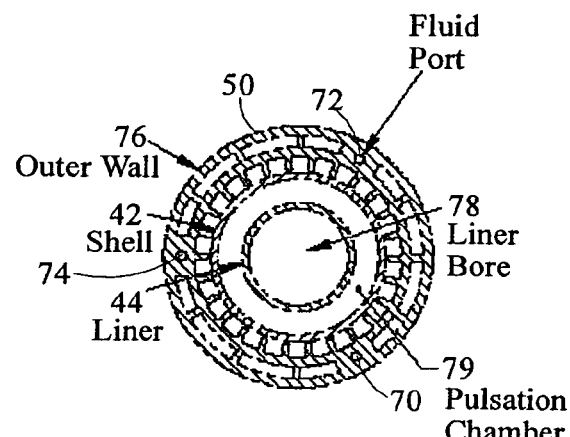
FIG. 7 is a cross-sectional view of the milking teat cup of FIG. 5 taken along the lines 7—7 of FIG. 5.
Figure 8:
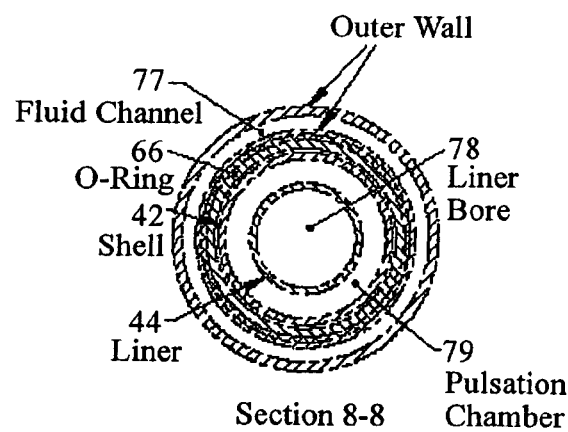
FIG. 8 is a cross-sectional view of the milking teat cup of FIG. 5 taken along the lines 8—8 of FIG. 5.

FIG. 5 illustrates the milking teat cup 40 from a side view including cross-sectional views shown in FIGS. 6–8. FIG. 6 illustrates a portion of the applicator 50 including fluid ports 70, 72, and 74 and an outer wall 76 extending around the periphery of the applicator 50. The liner 44 is contained within the applicator 50 and the teat can be inserted into the liner bore 78 present within the liner 44.

FIG. 7 illustrates the fluid ports 70, 72, and 74 and the outer wall 76 of the applicator 50. The liner 44 and the liner bore 78 are surrounded by the shell 42. FIG. 8 illustrates the presence of a fluid channel 77 between the outer wall 76 of the applicator 50 and the O-ring 66 that provides a seal between the applicator 50 and the shell 42. A pulsation chamber 79 is present between the liner 44 and the shell 42. The pulsation chamber 79 is the volume space that changes in pressure to enable the milking action of the liner 44.

Figure 9:
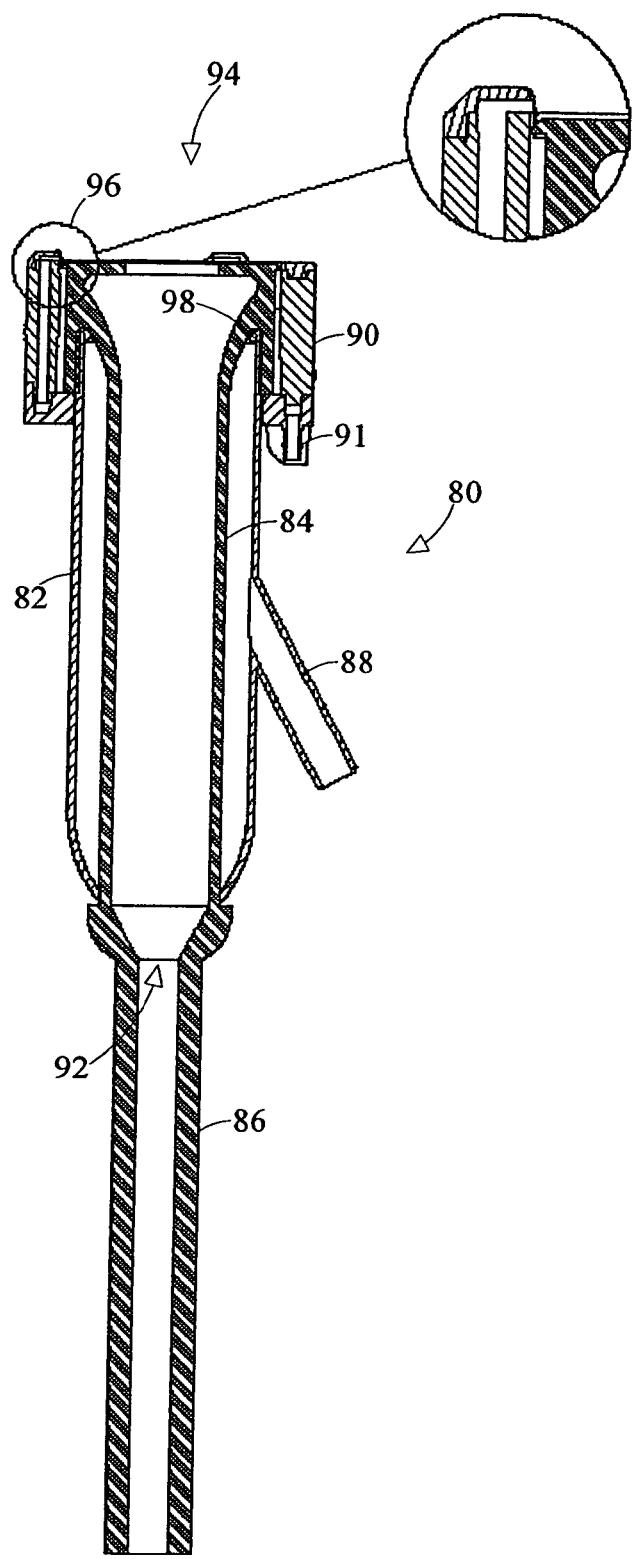
FIG. 9 is a side view of a milking teat cup in accordance with another exemplary embodiment.

FIG. 9 illustrates a milking teat cup 80 including a shell 82, a liner 84, a flexible short milk tube 86, a pressure connector 88, an applicator 90, and a fluid inlet 91. The shell 82 includes a cylindrical-shaped cup having a tapered end proximate a bottom opening 92. The shell 82 has a top opening 98 that forms an air-tight seal with the liner 84. This seal allows a vacuum force to be introduced via the pressure connector 88 and provide a milking action forces on the teat inside the milking teat cup 80.

The liner 84 includes an opening 94 proximate an opening mouthpiece 96. The opening mouthpiece 96 is a mold-formed exterior that overlaps the shell 82 at the top opening 98 to define a seal. Preferably, the flexible short milk tube 86 through which milk is directed from the teat is integral to the liner 84.

The applicator 90 can be an integral part of the shell 82 of the milking teat cup 80. Fluid, such as disinfectant and/or conditioning solution, can be provided to the applicator 90 via the fluid inlet 91. In an exemplary embodiment, a hose configured to transport the fluid from a fluid container to the milking teat cup 80 is coupled to the fluid inlet 91. The fluid inlet 91 provides a passageway for the fluid to travel to the applicator 90.

Figure 10:
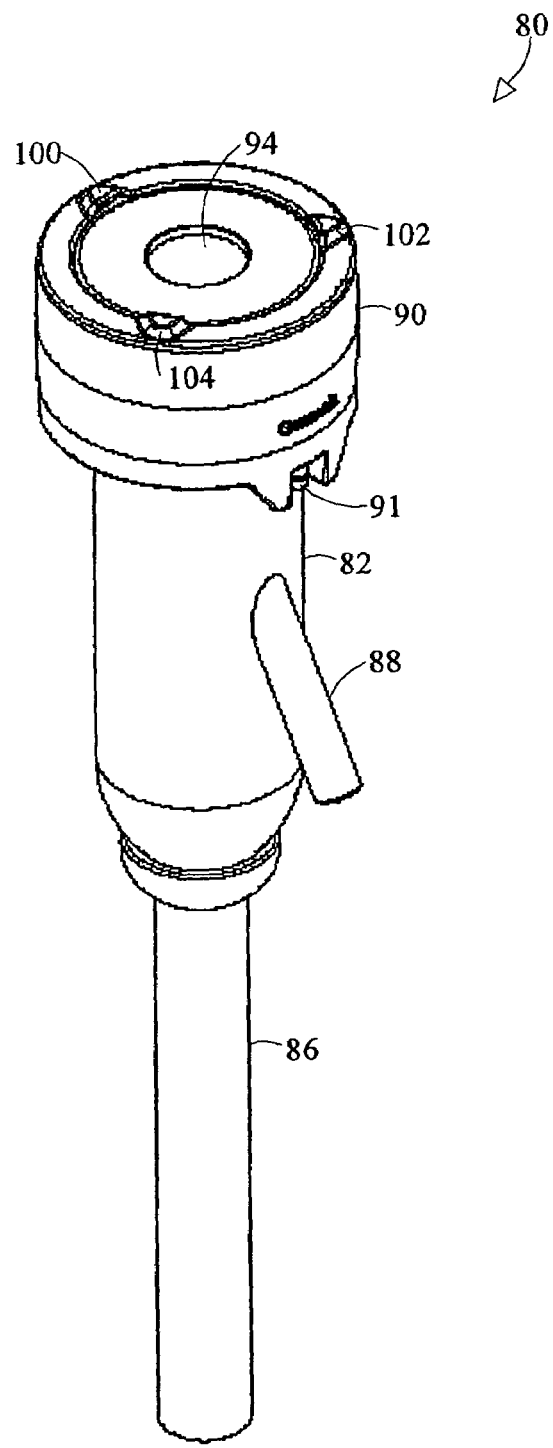
FIG. 10 is a perspective view of the milking teat cup of FIG. 9.

FIG. 10 illustrates the milking teat cup 80 in a perspective view. The applicator 80 includes orifices 100, 102, and 104 positioned to enable the delivery of fluid to the teat positioned inside the opening 94. Orifices 100, 102, and 104 deliver the fluid disinfectant and/or conditioning solution from the fluid inlet 91 across a horizontal plane over opening 94. As such, the disinfectant and/or conditioning solution can be applied to the teat as the teat is being removed from the milking teat cup 80.

Figure 11:
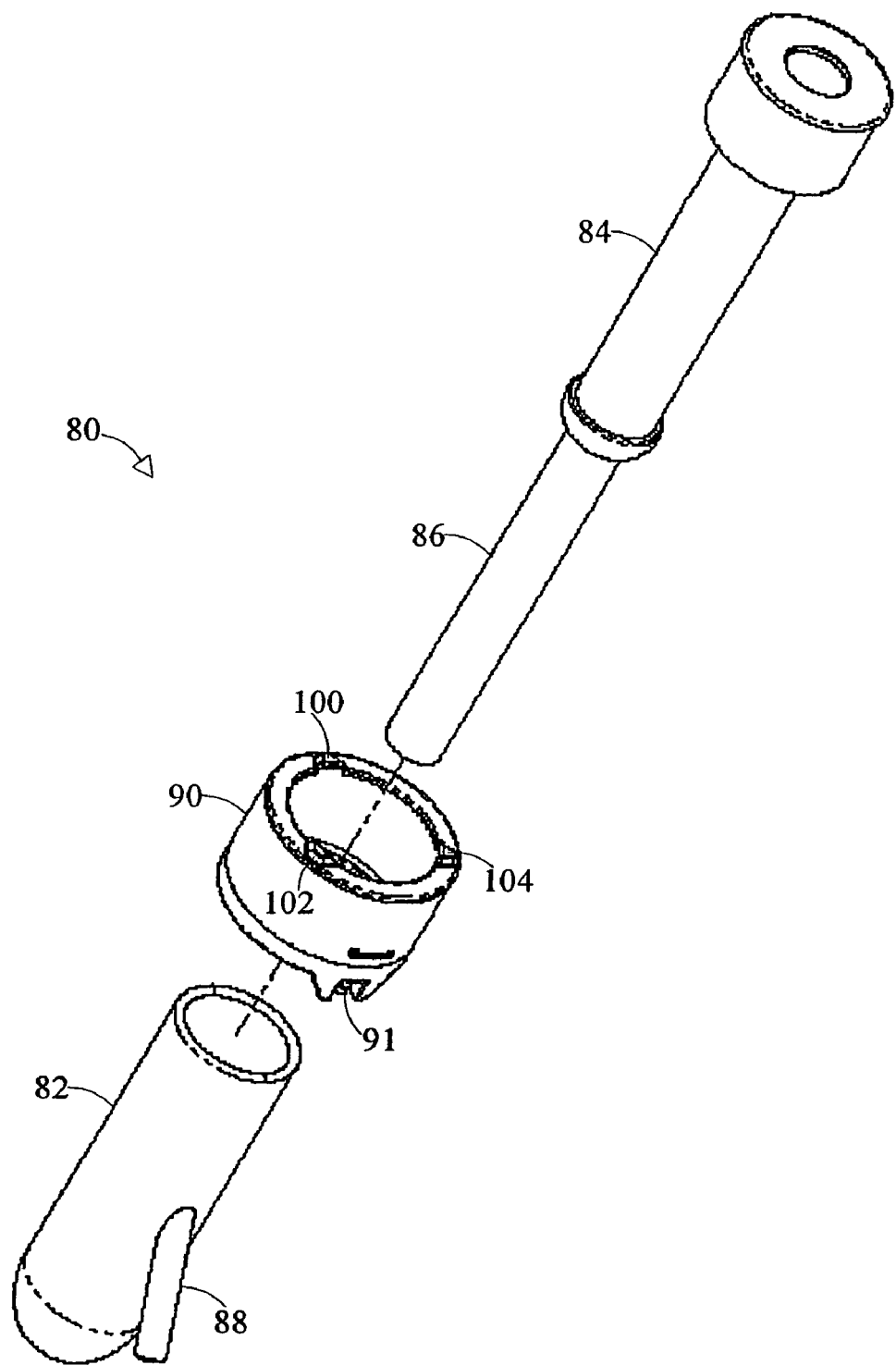
FIG. 11 is an exploded view of the milking teat cup of FIG. 9.

FIG. 11 illustrates the milking teat cup 80 from an exploded view. As described above, the flexible short milk tube 86 is coupled to the liner 84 at one end. The applicator 90 is coupled to the shell 82. The flexible short milk tube 86 and the liner 84 are placed through the applicator 90 and into the shell 82. The applicator 90 can be secured in place using glue, a fastening structure, or some other coupling means. The liner 84 can be held in place within the shell 82 by frictional forces or, alternatively, the liner can be affixed or attached in some way to the inside of shell 82.

Figure 12:
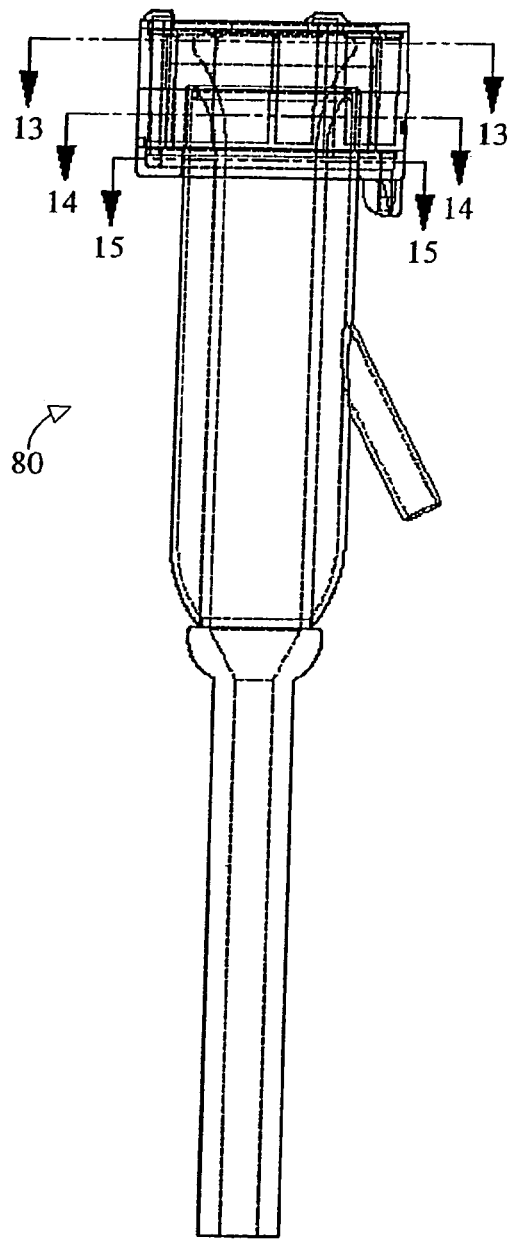
FIG. 12 is a side view of the milking teat cup of FIG. 8.
Figure 13:
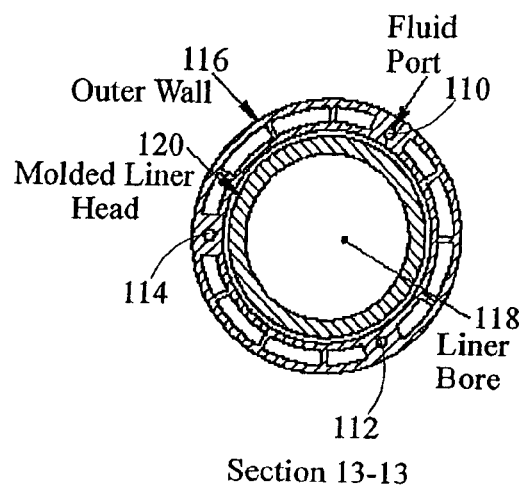
FIG. 13 is a cross-sectional view of the milking teat cup of FIG. 12 taken along the lines 13—13 of FIG. 12.
Figure 14:
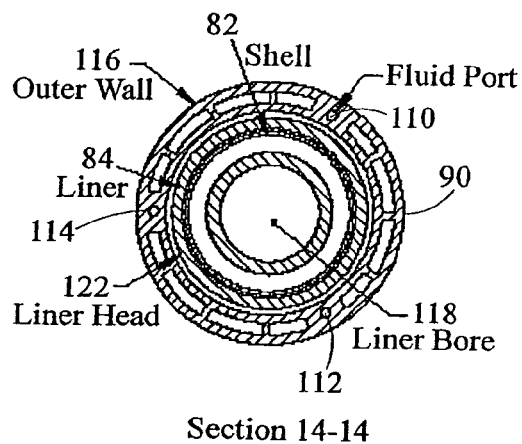
FIG. 14 is a cross-sectional view of the milking teat cup of FIG. 12 taken along the lines 14—14 of FIG. 12.
Figure 15:
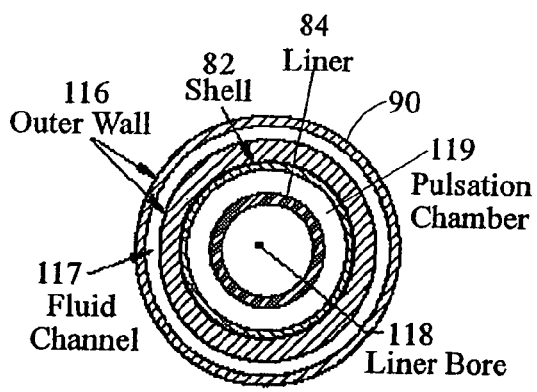
FIG. 15 is a cross-sectional view of the milking teat cup of FIG. 12 taken along the lines 15—15 of FIG. 12.

FIG. 12 illustrates the milking teat cup 80 from a side view including indications for cross-sectional views shown in FIGS. 13–15. It is possible to note structural differences in the embodiment of the milking teat cup 40 described with reference to FIGS. 2–8 and the milking teat cup 80 by comparing the cross-sectional views of FIGS. 9–13 with the cross-sectional views of FIGS. 13–15. FIG. 13 illustrates a portion of the applicator 90 including fluid ports 110, 112, and 114 and an outer wall 116 extending around the periphery of the applicator 90. The liner 84 is contained within the applicator 90 and a liner bore 118 is present within the liner 84. The liner 84 also includes a molded liner head 120 shown in cross-section 13—13.

FIG. 14 illustrates the fluid ports 110, 112, and 114 and the outer wall 116 of the applicator 90. At this cross-section, the liner 84 extends beyond the circumference of shell 42. A liner head skirt 122 extends below the opening mouthpiece 96 described with reference to FIG. 9.

FIG. 15 illustrates the presence of a fluid channel 117 within the applicator 110. A pulsation chamber 119 is present between the liner 84 and the shell 82. The pulsation chamber 119 is the volume space that changes in pressure to enable the milking action of the flexible liner 84 on the teat located within the liner bore 118.

Figure 16:
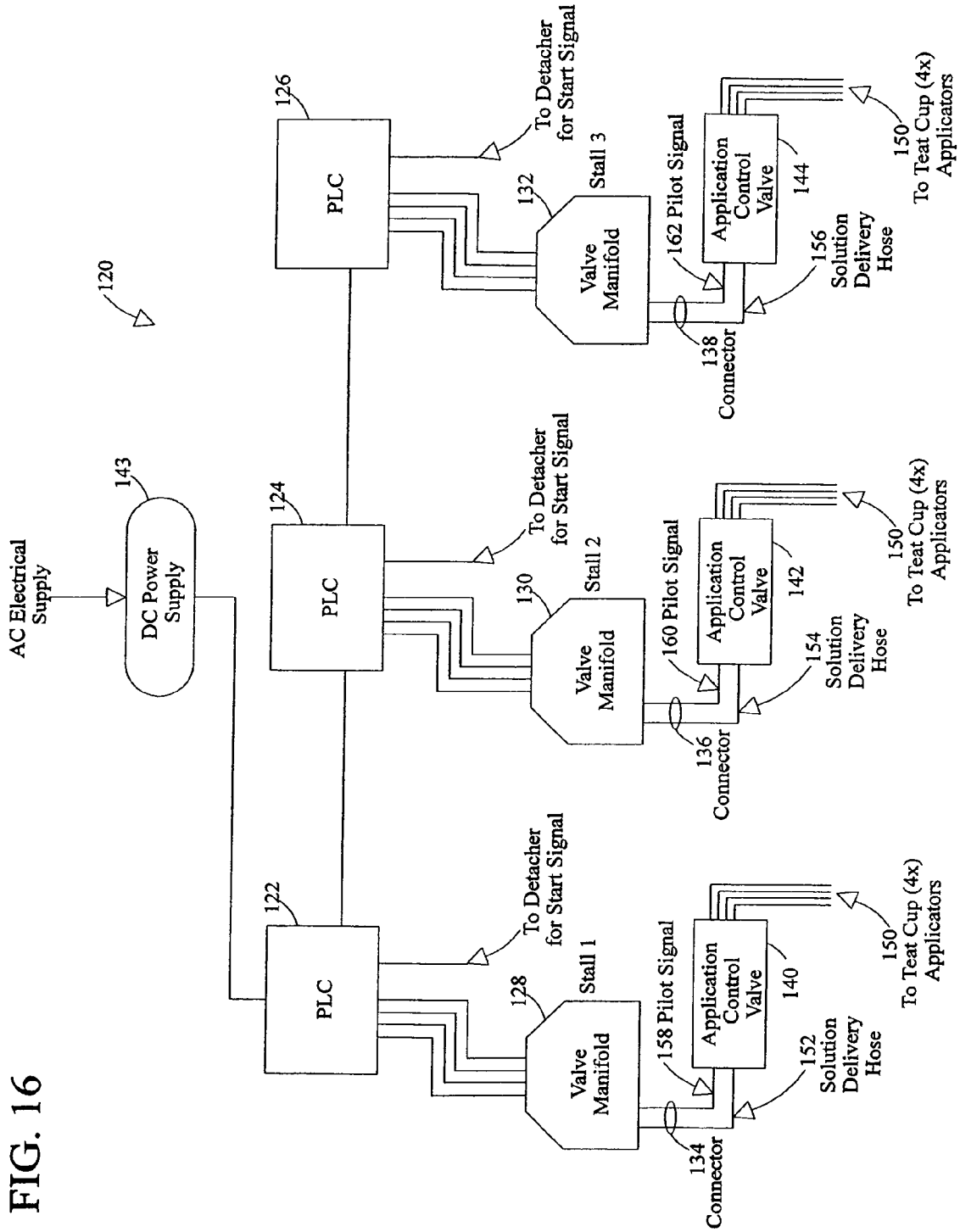
FIG. 16 is a diagram representing a portion of a control system for a milking system in accordance with the invention.

FIG. 16 illustrates a control system 120 for a milking system. The control system includes a number of programmable logic controllers (PLC) 122, 124, and 126; valve manifolds 128, 130, and 132; connectors 134, 136, and 138; applicator control valves 140, 142, and 144 with safety valve port; and teat cups 150. In an exemplary embodiment, PLCs 122, 124, and 126 receive power from a DC power supply 143. The PLCs 122, 124, and 126 are configured to provide control and signals to the valve manifolds 128, 130, and 132. The valve manifolds 128, 130, and 132 control the flow of disinfectant and/or conditioning solution as well as air pressure and/or rinse water to the teat cup applicators 150, by PLC control of individual function valves.

PLC 122, 124, or 126 signals the valve manifold 128, 130, or 132 to pre-charge a delivery hose 152, 154, or 156 with disinfectant and/or conditioning solution for the teat cups 150. Pre-charging dispenses the fluid to fill the delivery hose and place disinfectant and/or conditioning solution in a ready state. Pre-charging is preferably done when the PLCs 122, 124, or 126 determine that milking is progressing normally and for long enough to lead to normal end-of-milking shut-off. A function valve for disinfectant and/or conditioning fluid in the valve manifold (128, 130, or 132) opens for a fraction of a second to charge the solution delivery hose 152, 154, or 156 all the way to an applicator control valve 140, 142, or 144 and, if too much, out of the safety valve port via a discharge orifice.

Solution, air, or rinse water does not pass the applicator control valves 140, 142, or 144, during the milking process due to the construction of a spring return to safety sealed position. Additionally, applicator control valve 140 (or 142 or 144) can be constructed such that any delivery pressure of any solution, rinse, or air causes the applicator control valve 140 (or 142 or 144) to seal tightly and cause any fluid or air to be diverted out of safety valve port. A separate, preferably, air pressure, pilot signal 158 (or 160 or 162) to the applicator control valve 140 (or 142 or 144) shifts the applicator control valve 140 (or 142 or 144) into application position. A PLC (122, 124, or 126) control signal shifts a function valve for air pressure in the valve manifold (128, 130, or 132) to the delivery position. A pulse of air pressure from the PLC-controlled valve manifold's air pressure function valve pushes the already dispensed solution volume in the delivery hose through the applicator control valve 140 (or 142 or 144) and out the applicator orifices onto the teat wall and teat end. In an exemplary embodiment, the already dispensed volume can be approximately 10 mL. A normal delivery hose and applicator cleaning function of rinse water and air dry follows application of the disinfectant and/or conditioning solution once the teat cups are fully removed and the claw retracts to the storage position.

Figure 17:
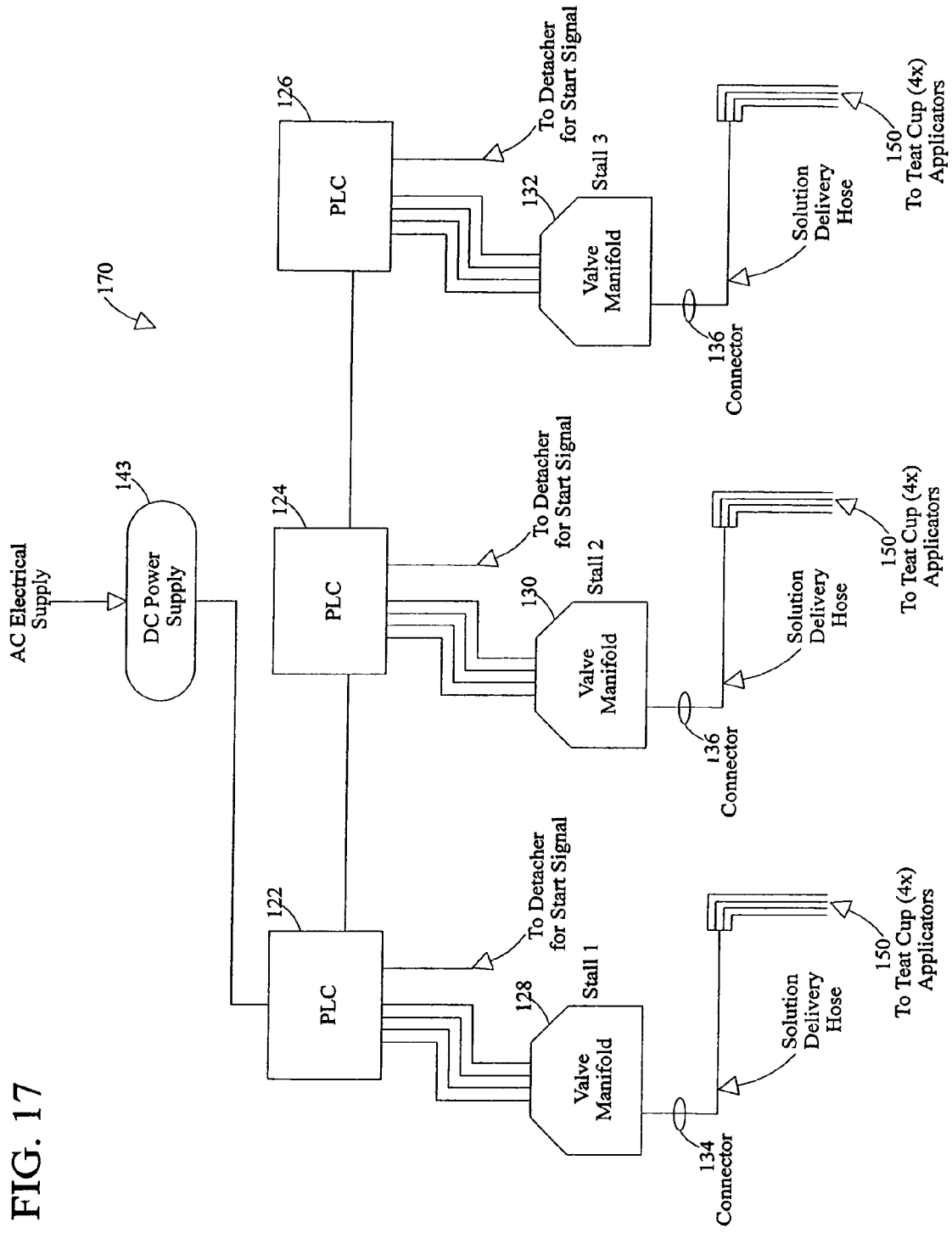
FIG. 17 is a diagram representing another exemplary control system for a milking system in accordance with the invention.

FIG. 17 illustrates a control system 170 for a milking system. The control system 170 is substantially similar to the control system 120 described above with reference to FIG. 16 with the exception that the control system 170 does not include applicator control valves 140, 142, and 144 coupled between the teat cups 150 and the valve manifolds 128, 130, and 132.

In this alternative embodiment, a microprocessor control permits the pre-charge to be made accurately without the applicator control valve. Fail-safe function is accomplished through microprocessor control provisions of valve manifold 128, 130, and 132.

In operation, both the control system 120 described with reference to FIG. 16 and the control system 170 are configured such that disinfectant and/or conditioning solution arrives at the teat after the milking vacuum is shut off and just as the teat is being disengaged from the teat cup. This timing is advantageous because if the vacuum hold on the teat is still present, any discharged solution could be drawn into the milk line. If the solution arrives after the teat is disengaged, the solution will miss the teat entirely. It is desirable that the solution be applied before the teat is fully removed from the teat cup so that solution is applied to the teat wall and end of the teat before the teat sphincter muscle recovers and while the teat orifice is still distended as a result of the milking action.

Preferably, a water flush is then applied to the applicator followed by an air dry to remove any solution residuals. As such, the delivery tubes and applicator are sanitized and ready for next use.

While the exemplary embodiments illustrated in the figures and described above are presently preferred, it should be understood that these embodiments are offered by way of example only. Other embodiments may include, for example, different configurations of discharge nozzles on the applicator. The invention is not limited to a particular embodiment, but extends to various modifications, combinations, and permutations that nevertheless fall within the scope and spirit of the appended claims.

What is claimed is:

1. A milking teat cup comprising:
   a structural container component defining a shell;
   a liner component configured to be mounted in the structural container component; and
   an applicator integral with the shell and configured to apply fluid in a horizontal plane across the top of the shell.

2. The teat cup of claim 1, wherein the applicator provides a substantially planar flow pattern, whereby circumferential application of the fluid on a teat received by the shell is maximized.

3. The teat cup of claim 1, wherein the liner component comprises any one of a ring-formed and mechanically-created exterior opening mouthpiece.

4. The teat cup of claim 1, wherein the liner component comprises a mold-formed exterior opening mouthpiece.

5. The teat cup of claim 1, wherein the liner component does not function in a milking action without the applicator.

6. The teat cup of claim 1, further comprising a locking mechanism to secure the applicator to the shell.

7. The teat cup of claim 1, wherein the applicator is integral to the perimeter of the top opening of the shell.

8. The teat cup of claim 1, wherein the fluid comprises any one of teat skin disinfectant and skin conditioner.

9. The teat cup of claim 1, wherein the applicator comprises a plurality of orifices.

10. A milking teat cup configured to apply a fluid treatment to a teat immediately after milking of the teat is completed by providing a substantially planar pattern flow of the fluid treatment across the top of the teat cup, the teat cup comprising:
    a shell having a top opening for receiving a teat and a bottom connection coupled to a milk receiving device;
    a liner located within the shell and having an open mouthpiece located proximate to the top opening of the shell; and
    an applicator with discharge nozzles located along a perimeter proximate to the top opening of the shell, the applicator providing fluid treatment through the discharge nozzles to the teat received by the shell at a horizontal plane to the top opening of the shell.

11. The teat cup of claim 10, wherein the liner has a ring-formed or mechanically created exterior mouthpiece.

12. The teat cup of claim 10, wherein the liner has a mold-formed exterior opening mouthpiece.

13. The teat cup of claim 10, wherein the applicator is removable from the shell.

14. The teat cup of claim 10, further comprising a locking mechanism to secure the applicator to the liner component.

15. The teat cup of claim 10, wherein the liner comprises an extension along the mouthpiece, the extension defining a seal with the shell.

16. The teat cup of claim 10, wherein the applicator has multiple discharge nozzles evenly spaced apart from each other.

17. A combination milking and applicator device comprising:
    a flexible milking sleeve having a shape for insertion of a teat through a first opening;
    an inflexible shell surrounding the flexible milking sleeve and providing for a vacuum space between the flexible milking sleeve and the inflexible shell, the inflexible shell having a second opening; and
    an applicator component located around the first and second openings of the flexible milking sleeve and the inflexible shell, the applicator component being configured to dispense fluid over the first and second openings of the flexible milking sleeve and the inflexible shell.

18. The device of claim 17, wherein the applicator component discharges fluid at a teat located in the flexible milking sleeve and the inflexible shell.

19. The device of claim 17, wherein the applicator component facilitates a coating and wiping action of disinfectant on the teat.

20. The device of claim 17, wherein the applicator component is integral to the flexible milking sleeve.

21. The device of claim 17, wherein the applicator component comprises an elastomeric material.

22. The device of claim 17, wherein the applicator component comprises discharge nozzles.

23. A milking system including a combination milking and applicator device, the milking system comprising:
    a plurality of teat cups, the teat cups including applicators integrally attached thereto, the applicators being configured to apply fluid in a horizontal plane and inward fashion across a top of the teat cups;
    a valve manifold coupled to the teat cup applicators, the valve manifold controlling flow of fluid to the applicators; and
    a controller including logic configured to provide control signals to the valve manifold, the controller signaling the valve manifold to pre-charge a hose delivering fluid to the applicators and signaling the valve manifold for end of milking and begin delivery of the fluid from the applicators.

24. The milking system of claim 23, further comprising an applicator control valve coupled between the valve manifold and the number of teat cups.

25. The milking system of claim 24, wherein the applicator control valve comprises a safety valve comprising a discharge orifice.

26. The milking system of claim 23, wherein the pre-charge of the hose delivering fluid to the applicator dispenses 10 mL or less of fluid to the hose.

27. The milking system of claim 23, wherein the applicators comprise multiple discharge nozzles evenly spaced apart from each other.

28. The milking system of claim 23, wherein the number of teat cups is more than one.

29. The milking system of claim 23, further comprising a plurality of valve manifolds and a plurality of controllers.

30. The milking system of claim 29, further comprising a power supply coupled to the controllers.

31. A milking method including a combination milking and applicator device, the milking method comprising:

commencing a milking session in which milk is delivered from animal teats engaged by teat cups, the teat cups having open ends defined as tops;

pre-charging a fluid line coupled to the teat cups with a disinfectant and/or conditioning fluid;

terminating the milking session; and dispensing any one of disinfectant and conditioning fluid from the fluid line out of applicators across the tops of the teat cups, the dispensing commencing when the number of teat cups begin to disengage from the animal teats.

32. The milking method of claim 31, further comprising applying a water flush or drying air to the applicators in the teat cups after the disinfectant and/or conditioning fluid is dispensed.

33. The milking method of claim 31, wherein the any one of disinfectant and conditioning fluid comprises any one of a disinfectant, conditioning, and cleaning component.

34. The milking method of claim 31, wherein the applicators apply the any one of disinfectant and conditioning fluid in a horizontal plane and inward fashion across a top of the teat cups.

35. The milking method of claim 31, wherein pre-charging a fluid line coupled to the number of teat cups with any one of disinfectant and conditioning fluid comprises dispensing 10 mL or less of disinfectant and/or conditioning fluid in the fluid line without dispensing the fluid out the applicators to the teat cups.

* * * * *

UNITED STATES PATENT AND TRADEMARK OFFICE
CERTIFICATE OF CORRECTION

| | | |
|---|---|---|
| PATENT NO. | : 6,935,270 B2 | Page 1 of 1 |
| APPLICATION NO. | : 10/652585 | |
| DATED | : August 30, 2005 | |
| INVENTOR(S) | : Stuart Wipperfurth and Russell Kolstad | |

It is certified that error appears in the above-identified patent and that said Letters Patent is hereby corrected as shown below:

Title page,
Item [56], References Cited, FOREIGN PATENT DOCUMENTS,
delete "89/118720" and replace with -- 89/116720 --.

Signed and Sealed this

Twentieth Day of June, 2006

JON W. DUDAS
*Director of the United States Patent and Trademark Office*